Oct. 29, 1940.  E. W. SMITH  2,220,005

VENT AND FILLING DEVICE

Filed June 4, 1938  3 Sheets-Sheet 1

WITNESS:

INVENTOR
Edward W. Smith
BY
ATTORNEY.

Oct. 29, 1940.  E. W. SMITH  2,220,005
VENT AND FILLING DEVICE
Filed June 4, 1938   3 Sheets-Sheet 2
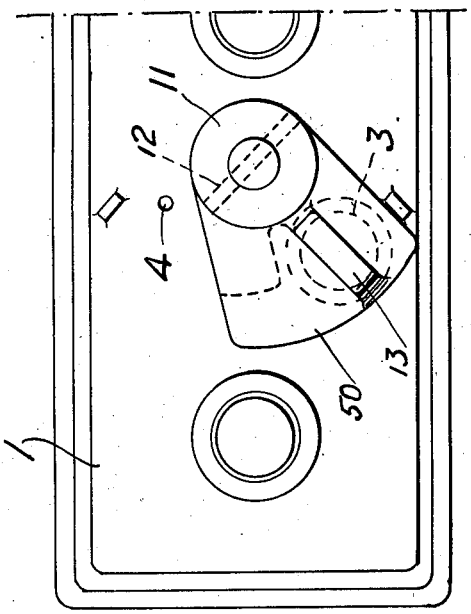
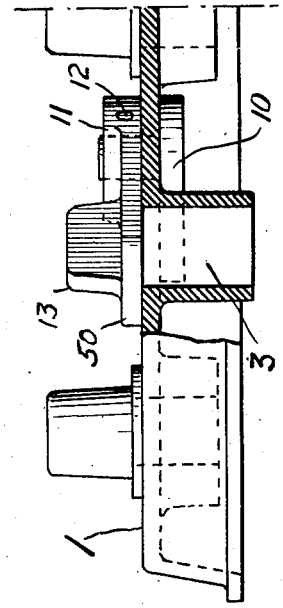
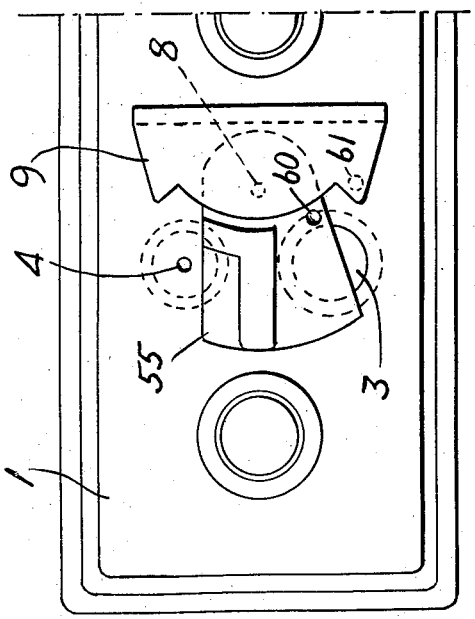
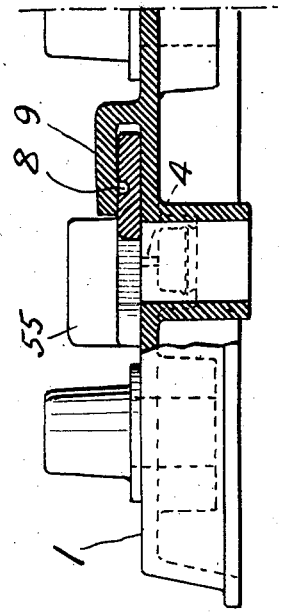
INVENTOR
Edward W. Smith
BY Augustus B Stoughton
ATTORNEY.
WITNESS:
Rob R Kitchel Oct. 29, 1940.　　　　　E. W. SMITH　　　　　2,220,005
VENT AND FILLING DEVICE
Filed June 4, 1938　　　　3 Sheets-Sheet 3

WITNESS:
Robt R Mitchel.

INVENTOR
Edward W. Smith
BY
Augustus B Stoughton
ATTORNEY.

Patented Oct. 29, 1940

2,220,005

UNITED STATES PATENT OFFICE 2,220,005

VENT AND FILLING DEVICE

Edward W. Smith, Philadelphia, Pa., assignor to The Electric Storage Battery Company, Philadelphia, Pa., a corporation of New Jersey Application June 4, 1938, Serial No. 211,709

4 Claims. (Cl. 136—178)

The object of this invention is to provide a device to be used in connection with storage batteries, especially of the starting, lighting and ignition type, and so designed as to facilitate flushing of the battery with water up to the proper level and, when this proper level is reached, giving visible indication, so that over-filling may be avoided.

In that embodiment of my invention chosen from among others for illustration in the drawings and description in the specification, my device is shown as follows:

Fig. 4 is a top or plan view of a portion of a modified form of storage battery cell cover and terminal posts.

Fig. 5 is a side view of the cell cover shown in Fig. 4 with parts broken away in vertical cross-section.

Fig. 6 is a top or plan view of a portion of a second modified form of cell cover and terminal posts.

Fig. 7 is a side elevation of the modification shown in Fig. 6 with parts broken away in vertical cross-section.

Figure 1:
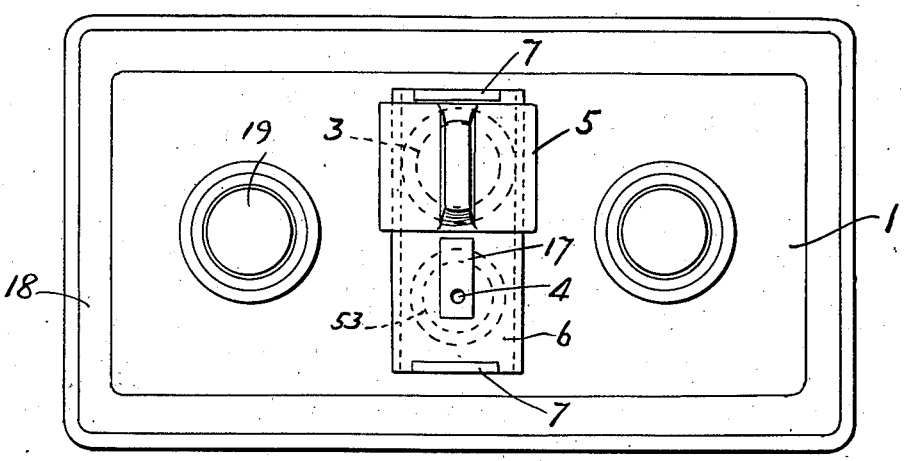
Fig. 1 is a top or plan view of a storage battery cell.
Figure 2:
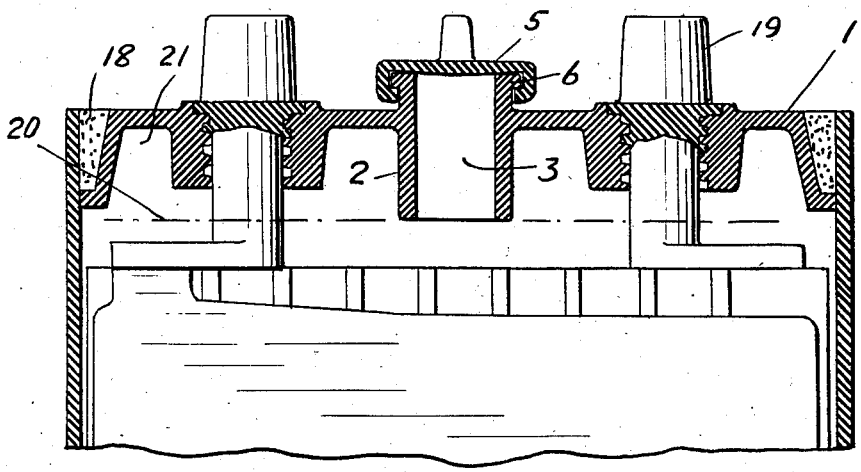
Fig. 2 is a vertical, longitudinal cross-section of the device shown in Fig. 1.
Figure 3:
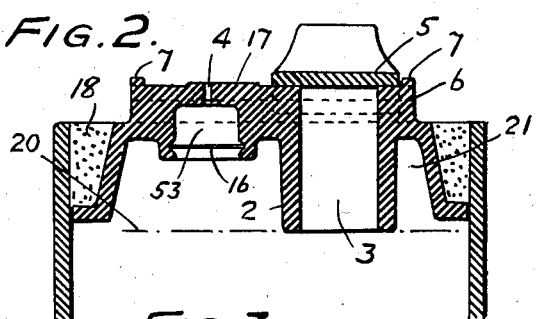
Fig. 3 is a vertical, transverse section of the device shown in Fig. 1.
Figure 8:
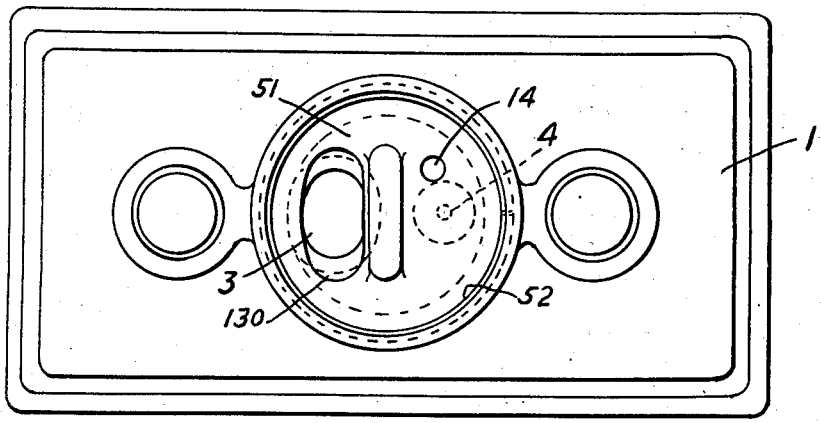
Fig. 8 is a top or plan view of a third modified form of cell cover and terminal posts.

Figs. 1, 2 and 3 show the simplest embodiment of the principle while the other figures show various modifications of detail, the same numbers always referring to the same or corresponding parts in whatever design used. Figs. 1 and 2 show the upper part of a cell, having the cover 1 sealed in place by means of sealing compound 18. The terminals 19 of the battery are shown as projecting through the cover and tightly sealed therein, but the details of this form no part of this invention. The cover 1 is provided with a downwardly projecting tube 2 having a large opening 3 therethrough and suitable for the introduction of water or for the insertion of a hydrometer syringe in order to take specific gravity readings. The tube 2 projects downward into the cell to the point of the highest level to which it is desired to fill with water when flushing, this level being indicated at 20. Adjacent tube 2, with its opening 3, is another small opening 4 through the cover suitable for a gas vent, but much too small to be used for flushing purposes. Beneath opening 4 may be provided a baffle 16. It will thus be seen that, underneath the cover, there is what may be called a gas chamber 21, above the electrolyte level, and closed tightly except for the two openings 3 and 4.

On the top of the cover is a raised runway 6 and on this runway is a slider 5 engaging with the runway by overhanging flanges, as shown, so that it may slide from end-to-end but is held closely down to the upper surface of the runway. The slider 5, as shown in Fig. 2, is curved slightly downward at its middle for the double purpose of insuring that it fits tightly on top of the runway and also providing a small amount of friction to prevent the slider from moving from side-to-side with vibration of the battery. The slider is restricted in its motion by a slight projection 7 at each end of the runway, one or both of said projections being so slight as to permit the slider to be placed upon the runway by bending the middle portions upwards.

The operation of the device is as follows: When it is desired to flush the cell with water, the slider 5 is pushed to one side so as to uncover the filling tube 3 (that is to say, into the opposite position to that shown in Fig. 1) and at the same time to automatically close the vent opening 4. Water may then be freely introduced into the cell through opening 3 until the level rises inside the cell to the bottom of tube 2. At this point, further exit of the air from the gas chamber 21 is cut off so that no more water will descend through the tube but will at once rise in the tube, or even overflow, thus indicating to the operator that the cell has been filled to the right level and requires no more water. Thereafter, the slider is pushed into the position which covers opening 3 and opens the vent 4. In this position, then, the battery is ready again for use and the opening 4 permits of exit of the gas generated in normal operation, but is too small to permit electrolyte to splash out especially when a baffle, as at 16, is provided.

An important feature of the device has to do with the equalizing-charge of the battery when charging is continued for a considerable period after gassing has commenced. During this time, it is important to take several readings of specific gravity with a hydrometer syringe in order to determine when sufficient equalizing-charge has been given. To take the specific gravity readings, it is necessary that the filling opening be uncovered so as to permit insertion of the hydrometer syringe. With the level-limiting device now used, this requires removal of the vent plug but, due to the level-limiting feature, this also causes closure of the vent and thus leaves the gas chamber 21 completely sealed above the high level line.

Before equalizing-charge is to be given a battery, it is usual to adjust the electrolyte by adding water to the proper level; that is, until the electrolyte surface reaches the bottom of tube 2. During the equalizing-charge, as soon as gassing commences, the electrolyte level is appreciably raised by the presence of gas bubbles entrained in the electrolyte, and thus the filling opening 3 is sealed against exit of gas from the gas chamber. The gas which now rapidly accumulates in the chamber thus exerts a pressure on top of the electrolyte, forcing it up through the filling opening 3 and flooding the top of the cell. This flooding is very detrimental in two respects: first, that it causes loss of electrolyte; and, second, that it promotes corrosion of any metal parts which may happen to be adjacent the battery.

The present invention overcomes this objection since the slider 5 may be pushed into a mid-position from that shown in Figs. 1 and 3, uncovering simultaneously both the vent opening 4 and a portion of the filling opening 3. With the slider in this position, it is possible to take specific gravity readings by inserting the hydrometer syringe through the filling opening 3 while, at the same time, the vent opening 4 permits of the exit of gas from the top of the gas chamber and thus obviates the flooding of the cell.

Another embodiment of the device is shown in Figs. 4 and 5. As here illustrated, the movable piece 55, instead of sliding, is arranged around a pivot 8, so as to open and close the two openings 3 and 4 in the same way as already described. The slider is held in position, in this case, by an overlapping arm 9, with a slight projection forming the pivot 8 and attached to or forming part of the cover 1.

By forming the overlapping arm 9 bent slightly downward, the slider 55 is held tightly down to the cover and at the same time friction is provided for holding it in place. The arm 9 is sufficiently resilient to be lifted slightly to permit the pivot 8 to slide over the surface of the part 55 and snap into the recess provided to receive it.

A third modification of the device is shown in Figs. 6 and 7, wherein the slider is made in two parts 58 and 10, 50 on top of the cover and 10 below, and the two fastened together by means of a boss 11 and pin 12 so that, when the upper slider 58 is moved by means of the wing 13, the two sliders work as one. The object of this arrangement is to secure greater tightness of the vent opening 4 by having closure both on top and bottom of the cover, the lower surfaces being generally wet and hence likely to seal more tightly. The two parts of the slider also afford a convenient means of establishing friction between them, so as to prevent displacement of the slider when the battery is subject to vibration in a car.

Figure 9:
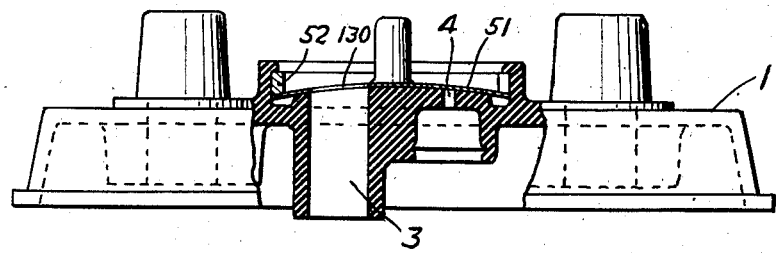
Fig. 9 is a side view of the modification shown in Fig. 8 with parts broken away in vertical cross-section.
Figure 10:
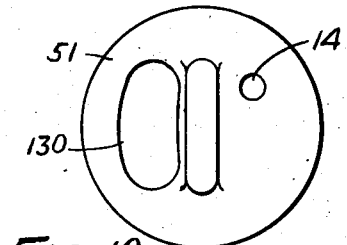
Fig. 10 is a top or plan view of the vent plug shown in Figs. 8 and 9.
Figure 11:
Fig. 11 is a side view of the vent plug shown in Fig. 10.

A further modification is shown in Figs. 8, 9, 10 and 11, wherein the slider 51 consists of a disk provided with a hole 130, which may be turned so as to uncover either the filling hole 3 or the gas vent 4, and also with a smaller opening 14 so that, when desired, during periods of equalizing-charge, both openings 3 and 4 may be opened simultaneously. The top of the cover, with which the slide disk 51 contacts, is made slightly convex and the disk is held in place upon the cover by means of a split ring 52, as shown in Fig. 9. This arrangement again affords the necessary friction to prevent the disk from turning freely and also holds it tightly down so as to secure closure of the vents 3 and 4, as desired.

It will be obvious to anyone skilled in the art that numerous modifications of the design may be made, other than the four illustrated, which, however, are sufficient to indicate the novel features involved in the invention. A few such variations of design are as follows.

Since it is especially important that the vent opening 4 be closed tightly while water is being introduced in opening 3, the portion of cover 1 surrounding this opening may be slightly raised, as indicated at 17, in Figs. 1 and 3. This raised portion insures contact with the slider, no matter which of the designs is used, and practically insures a tight seal.

Another refinement shown in several of the designs consists in placing a small chamber 53 directly below the gas vent 4 and providing a perforated disk 16 for the purpose of arresting any spray that may be formed within the cell (see Fig. 3).

Also, if necessary, slight notches and projections may be provided on the various slides to act in conjunction with the friction and further lock the slider in one or other of the desired positions. In Figs. 1 and 3, this projection is shown at 17, being the same which has been already mentioned as insuring a tight closure of the gas vent 4. In Fig. 4, a notch or depression 60 and a cooperating button or projection 61 are shown. In any of the designs mentioned, a suitable knob or wing may be provided for moving the slider. In general, it is to be assumed that the slider would be made of hard rubber or other suitable acid-resisting and resilient material.

The device described has several advantages over existing types of vent plugs intended generally to accomplish the same purpose. Among these may be mentioned the following.

The device is all self-contained, so that there is no removable part which may be lost, as is the case with present vent plugs when they are removed for the purpose of filling the cells.

It does not depend on any compressible soft rubber parts which are employed in some existing devices of the same kind.

The device makes it possible, by setting the slider in a mid-position, to have both vent and filling tubes open at the same time and thus permit of taking gravity readings with a hydrometer through the large opening without danger of flooding the cell due to the gas generated during charge.

I do not intend to be limited save as the scope of the prior art and of the attached claims may require.

I claim:
1. A storage battery having a container provided with a filling opening therethrough communicating with the interior at the level desired to be the normal electrolyte level and provided with a vent therethrough communicating with the interior above the normal electrolyte level, and a closure member movably mounted on said container and of a size larger than said filling opening and than said vent and of a size relative to the distance between them to close either said filling opening or said vent or to occupy an intermediate position in which both said vent and said filling opening are at least partially open.

2. A storage battery having a container provided with a filling opening therethrough communicating with the interior at the level desired to be the normal electrolyte level and provided with a vent therethrough communicating with the interior above the normal electrolyte level, a closure member movably mounted on said container and of a size larger than said filling opening and than said vent and of a size relative to the distance between them to close either said filling opening or said vent or to occupy an intermediate position in which both said vent and said filling opening are at least partially open, and cooperating members on said container and on said closure member arranged to interengage and to latch said closure member in one position.

3. A storage battery having a container provided with a filling opening therethrough communicating with the interior at a level desired to be the normal electrolyte level and provided with a vent therethrough communicating with the interior at a level above said normal electrolyte level, a closure member mounted for movement on said container and of a size larger than said filling opening and than said vent and of a size relative to the distance between them to close said filling opening or said vent or to occupy an intermediate position in which both said vent and said filling opening are at least partially open, and interengaging means on said container and on said closure member, at least one of said means being sufficiently flexible to bend and thus to permit mounting of said closure member on said container.

4. A storage battery having a container provided with a filling opening therethrough communicating with the interior at the level desired to be the normal electrolyte level and provided with a vent therethrough spaced from said filling opening and communicating with the interior above the normal electrolyte level, and a closure means movably mounted on said container so as to occupy three positions of rest thereon, said closure means closing said filling opening in one extreme position and closing said vent in another extreme position or occupying an intermediate position in which both said vent and said filling opening are at least partially open, said filling opening being sufficiently open to provide for the insertion of an hydrometer syringe.

EDWARD W. SMITH.